(12) United States Patent
Allpress et al.

(10) Patent No.: US 7,656,943 B2
(45) Date of Patent: *Feb. 2, 2010

(54) HIGH PERFORMANCE EQUALIZER HAVING REDUCED COMPLEXITY

(75) Inventors: Stephen Allpress, Bristol (GB); Quinn Li, S. Burlington, VT (US)

(73) Assignee: Broadcom Corporation

( * ) Notice: Subject to any disclaimer, the term of this patent is extended or adjusted under 35 U.S.C. 154(b) by 512 days.

This patent is subject to a terminal disclaimer.

(21) Appl. No.: 11/376,002

(22) Filed: Mar. 14, 2006

(65) Prior Publication Data

US 2006/0176949 A1 Aug. 10, 2006

Related U.S. Application Data

(63) Continuation of application No. 09/941,300, filed on Aug. 27, 2001, now Pat. No. 7,012,957.

(60) Provisional application No. 60/265,740, filed on Feb. 1, 2001, provisional application No. 60/265,736, filed on Feb. 1, 2001, provisional application No. 60/279,907, filed on Mar. 29, 2001.

(51) Int. Cl.
*H03H 7/30* (2006.01)
*H03H 7/40* (2006.01)
*H03K 5/159* (2006.01)

(52) U.S. Cl. ............... 375/233; 375/229; 375/346; 375/350; 708/322; 708/323

(58) Field of Classification Search ............ 375/229, 375/234, 346, 348, 350, 233; 708/322, 323
See application file for complete search history.

(56) References Cited

U.S. PATENT DOCUMENTS

| | | | |
|---|---|---|---|
| 4,905,254 A | 2/1990 | Bergmans | |
| 5,031,195 A | 7/1991 | Chevillat et al. | |
| 5,513,214 A | 4/1996 | Gozzo | |
| 5,513,215 A | 4/1996 | Marchetto et al. | |
| 6,608,862 B1 | 8/2001 | Zangi et al. | |
| 6,301,315 B1 | 10/2001 | Li | |
| 6,535,554 B1 | 3/2003 | Webster et al. | |
| 7,012,957 B2 * | 3/2006 | Allpress et al. | 375/233 |
| 7,151,796 B2 * | 12/2006 | Allpress et al. | 375/229 |
| 2002/0131488 A1 | 9/2002 | Allpress et al. | |
| 2002/0131490 A1 | 9/2002 | Allpress et al. | |

OTHER PUBLICATIONS

Lee et al, "A Maximum-Likelihood Sequence Estimator with Decision-Feedback Equalization", Sep. 1977, IEEE Transactions on Communications, vol. COM-25, No. 9, pp. 971-979.*

* cited by examiner

*Primary Examiner*—Phuong Phu
(74) *Attorney, Agent, or Firm*—McAndrews, Held & Malloy, Ltd.

(57) ABSTRACT

An apparatus and method for implementing an equalizer which combines the benefits of a decision feedback equalizer (DFE) with a maximum-a-posterori (MAP) equalizer (or a maximum likelihood sequence estimator, MLSE) to provide an equalization device with significantly lower complexity than a full-state MAP device, but which still provides improved performance over a conventional DFE. The equalizer architecture includes two DFE-like structures, followed by a MAP equalizer. The first DFE forms tentative symbol decisions. The second DFE is used thereafter to truncate the channel response to a desired memory of $L_1$ symbols, which is less than the total delay spread of L symbols of the channel. The MAP equalizer operates over a channel with memory of $L_1$ symbols (where $L_1 <= L$), and therefore the overall complexity of the equalizer is significantly reduced.

7 Claims, 13 Drawing Sheets

HIGH PERFORMANCE EQUALIZER HAVING REDUCED COMPLEXITY

CROSS-REFERENCE TO RELATED APPLICATIONS

The present application is a continuation of U.S. patent application Ser. No. 09/941,300, filed Aug. 27, 2001 now U.S. Pat. No. 7,012,957, which claims priority of the following—U.S. Provisional patent application having Ser. No. 60/265,740, entitled "A Decision Feedback Equalizer for Minimum and Maximum Phase Channels," filed Feb. 1, 2001; U.S. Provisional patent application having Ser. No. 60/265,736 entitled "Method For Channel Equalization For TDMA Cellular Communication Systems," filed Feb. 1, 2001; and U.S. Provisional patent application having Ser. No. 60/279,907, entitled "A Novel Approach to the Equalization of EDGE Signals," filed Mar. 29, 2001; all of which are hereby incorporated by reference in their entirety.

The application is also related to U.S. patent application having Ser. No. 09/941,027, entitled "Decision Feedback Equalizer for Minimum and Maximum Phase Channels," filed Aug. 27, 2001, now U.S. Pat. No. 7,006,563, and hereby incorporated by reference.

FIELD OF THE INVENTION

The present invention provides an improved method and apparatus for channel equalization in communication systems, wherein the advantages of a decision feedback equalizer (DFE) are combined with those of a non-linear equalizer, including a maximum-a-posteriori (MAP) or maximum-likelihood sequence estimator (MLSE) equalizer.

BACKGROUND OF THE INVENTION

This invention addresses the receiver design for digital communication systems employing high-order modulation schemes and operating in highly temporally dispersive channels. As an example, this invention has been applied to the EDGE standard ("Digital Cellular Communication System (Phase 2+) (GSM 05.01-GSM 05.05 version 8.4.0 Release 1999)"). The EDGE standard is built on the existing GSM standard, using the same time-division multiple access (TDMA) frame structure. EDGE uses 8-PSK (Phase-shift keying) modulation, which is a high-order modulation that provides for high-data-rate services. In 8-PSK modulation, three information bits are conveyed per symbol by modulating the carrier by one of eight possible phases.

A wireless channel is often temporally dispersive. In other words, after a signal is transmitted, a system will receive multiple copies of that signal with different channel gains at various points in time. This time dispersion in the channel causes inter-symbol interference (ISI) which degrades the performance of the system. FIG. 1 shows a prior art example of a multipath channel profile. The main signal cursor 102 is followed in time by post-cursors 104, 106, 108, and 110.

To combat the effects of ISI at the receiver, many different types of equalization techniques can be used. One popular equalization technique uses a Decision Feedback Equalizer (DFE). The DFE cancels the extraneous multipath components to eliminate the deleterious effects of ISI. A DFE is relatively simple to implement and performs well under certain known circumstances. The performance of the DFE depends heavily on the characteristics of the channel. A DFE typically performs well over a minimum-phase channel, where the channel response has little energy in its pre-cursors, and its post-cursor energy decays with time. A DFE typically consists of a feed-forward filter (FFF) and a feedback filter (FBF). The FFF is used to help transform the channel into such, a minimum-phase channel. Methods for computing the coefficients of the FFF and FBF (based upon channel estimates) are well known. See, e.g., N. Al-Dhahir and J. M. Cioffi, "Fast Computation of Channel-Estimate Based Equalizers in Packet Data Transmission," *IEEE Trans. Signal Processing*, vol. 43, pp. 2462-2473, November 1995, the contents of which are incorporated herein by reference.

Certain advantages of a DFE include good performance with relatively low complexity. Certain disadvantages include, but are not limited to: (1) Error propagation—i.e., once an error is made, that error is fed back and propagated into future symbol decisions. (2) Sub-optimum performance—i.e., instead of capturing multipath energy in the channel, the DFE instead cancels out this energy. (3) Hard decision output—i.e., a DFE makes a decision on the transmitted symbol without providing any information associated with the reliability of that decision.

Other more complex equalization techniques utilize the multipath energy from the received signal, rather than trying to cancel the energy. Such equalizers include, but are not limited to, MLSE (Maximum Likelihood Sequence Estimation) and MAP (Maximum A Posteriori) Estimation. These non-linear equalization techniques make a determination as to the most likely transmitted symbols, based upon all of the available information to the receiver. The MLSE is the optimum sequence estimator over a finite channel response. The complexity of the MLSE equalizer grows exponentially with the channel response duration, and the equalizer produces hard symbol decisions. The MAP equalizer operates in a similar fashion to the MLSE equalizer but provides soft symbol decisions. The primary disadvantage of the MAP equalizer is complexity. Hence, while these example equalizers are better at handling problematic signals, their implementations can prove to be very complex and expensive for systems using high-order modulation, such as the EDGE system. See G. David Forney. Jr., "Maximum-Likelihood Sequence Estimation of Digital Sequences in the Presence of Intersymbol Interference," *IEEE Trans. Inform. Theory*, vol. 18, pp. 363-377, May 1972; J. G. Proakis, "Digital Communications," (3.sup.rd edition) New York; McGraw-Hill, 1995. The contents of both the foregoing references are incorporated herein by reference.

The complexity of the MLSE and MAP equalizers, implemented using the known Viterbi algorithm (or the like), is exponentially proportional to the memory of the channel. In particular, the number of states required in the MLSE or MAP equalizer is given by $M^L$, where M is the size of the symbol alphabet and L is the memory of the channel in symbols. Moreover, the use of 8PSK modulation in the EDGE system makes the complexity of the MLSE and MAP equalizers very large for channels with moderate delay spreads. Note that different channel models exist for different types of terrain and are used to quantify receiver sensitivity in the GSM standard. For example, the Hilly Terrain (HT) channel model has a profile that spans more than five symbols and would therefore require an MLSE or MAP equalizer with 32,768 states to achieve acceptable performance.

Techniques to reduce the number of states of the MLSE have been proposed. See, e.g., Alexandra Duel-Hallen and Chris Heegard, "Delayed decision-feedback sequence estimation," IEEE Transactions on Communications, vol. 37, no. 5, p. 428-436, May 1989; M. Vedat Eyboglu and Shahid U. Qureshi, "Reduced-state sequence estimation with set partitioning and decision feedback," IEEE Transactions on Communications, vol. 36, no. 1, pp. 13-20, January 1988. Under these techniques, a subset of the full state space is chosen as the state space, and a DFE is implemented on every state of the trellis (i.e., as shown in a state space diagram). However, the complexity of computing the path metric values in these algorithms is still very large for channels with a large delay spread.

Accordingly, what is needed in the field of the art is an equalizer device that provides for a simpler implementation, such as a DFE, but which provides the improved performance characteristics of a more complex equalizer, such as an MLSE or MAP. The equalizer should be generally applicable to all digital communication systems but provide particular advantage to coded systems using higher-order modulation schemes.

SUMMARY OF THE INVENTION

The present invention describes an equalizer which combines the benefits of a decision feedback equalizer (DFE) with a maximum-a-posterori (MAP) equalizer (or a maximum likelihood sequence estimator, MLSE) to provide an equalization device with lower complexity than a full-state MAP or MLSE device, but which still provides improved performance over a pure DFE solution.

In the present invention, the equalizer architecture includes two DFE-like structures, followed by a MAP equalizer. The channel response is estimated and used to derive the coefficients of the feed-forward and feedback filters. The coefficients of the feedback filter of the second DFE are a subset of the coefficients of the first feedback filter.

The first DFE acts like a conventional DFE and forms tentative symbol decisions. The second DFE is used thereafter to eliminate, or subtract, the impact of certain post-cursors that exist past a certain memory, $L_1$, (where $L_1 <= L$) of the channel, by using the tentative decisions formed by the first DFE. The effective channel response seen by the MAP equalizer is therefore constrained to a memory $L_1$, and therefore the overall complexity of the equalizer is significantly reduced. When the value of $L_1$ is zero, the proposed equalizer degenerates to a conventional DFE. When the value of $L_1 = L$, the proposed equalizer is a full state MAP equalizer. Therefore performance versus complexity trade-offs between a simple DFE and a full-state MAP equalizer can be made.

An MLSE equalizer might also be used in place of the MAP equalizer in the described configuration, if further complexity reduction is desired. However, usage of the MLSE will come at the expense of receiver sensitivity.

Accordingly, one aspect of the present invention provides for a reduced-state complexity equalizer apparatus for use with communication systems requiring equalization of a received incoming signal subject to intersymbol interference (ISI), the apparatus comprising: a first decision feedback equalizer device which utilizes coefficients derived from the estimated channel response and forms tentative symbol decisions; at least a second decision feedback equalizer device which utilizes coefficients derived from the estimated channel response and the tentative symbol decisions from the first decision feedback equalizer to truncate the channel response to a desired channel memory; at least one non-linear equalizer device for providing equalization of the channel response over the desired memory, whereby the overall complexity of the equalizer is reduced by reducing the effective delay spread of the channel.

Still another aspect of the present invention provides for a method for reducing the complexity of an equalizer for use with a communication system requiring equalization of a received incoming signal subject to intersymbol interference (ISI), the method comprising the steps of: deriving feedback and feed-forward coefficients for the associated feedback and feed-forward filters of a first and at least one subsequent decision feedback equalizer from the estimated channel response; utilizing the first decision feedback equalizer to form tentative decisions regarding certain symbols; utilizing at least one subsequent decision feedback equalizer to truncate the channel response to a desired memory; utilizing at least one non-linear equalizer for providing equalization of the channel response over the desired memory, whereby the overall complexity of the equalizer is reduced by reducing the effective delay spread of the channel.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments, and representative applications. The apparatus and processing methods are applicable to any wireless or wireline communication system where an equalizer is used to eliminate the ISI effects of the channel.

A representative application of the invention is the EDGE system, and a preferred embodiment is described below. Since radio spectrum is a limited resource, shared by all users, a method must be devised to divide up the bandwidth among as many users as possible. The GSM/EDGE system uses a combination of Time- and Frequency-Division Multiple Access (TDMA/FDMA). The FDMA part involves the division by the frequency of the (maximum) 25 MHz bandwidth into 124 carrier frequencies spaced 200 kHz apart. One or more carrier frequencies is assigned to each base station. Each of these carrier frequencies is then divided in time, using a TDMA scheme. The fundamental unit of time in this TDMA scheme is called a burst period, and it lasts for $15/26$ ms (or approximately 0.577 ms). Eight burst periods are grouped into a TDMA frame ($120/26$ ms, or approximately 4.615 ms) which forms the basic unit for the definition of logical channels. One physical channel is one burst period per TDMA frame.

Figure 1:
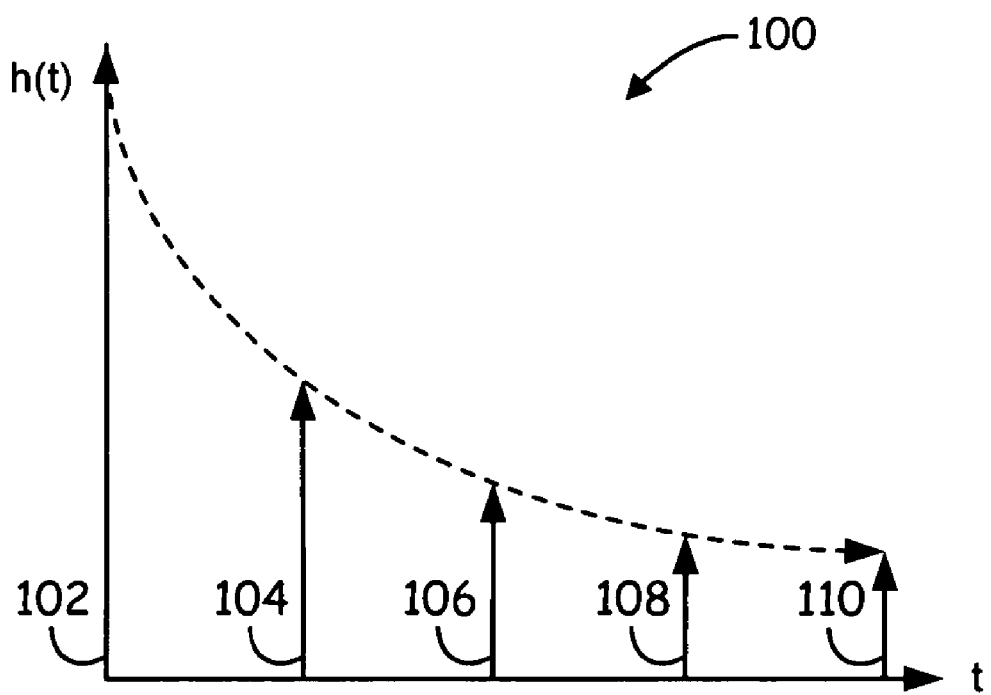
FIG. 1 is a prior art representation of typical multipath channel with a time-decaying channel response.
Figure 2:
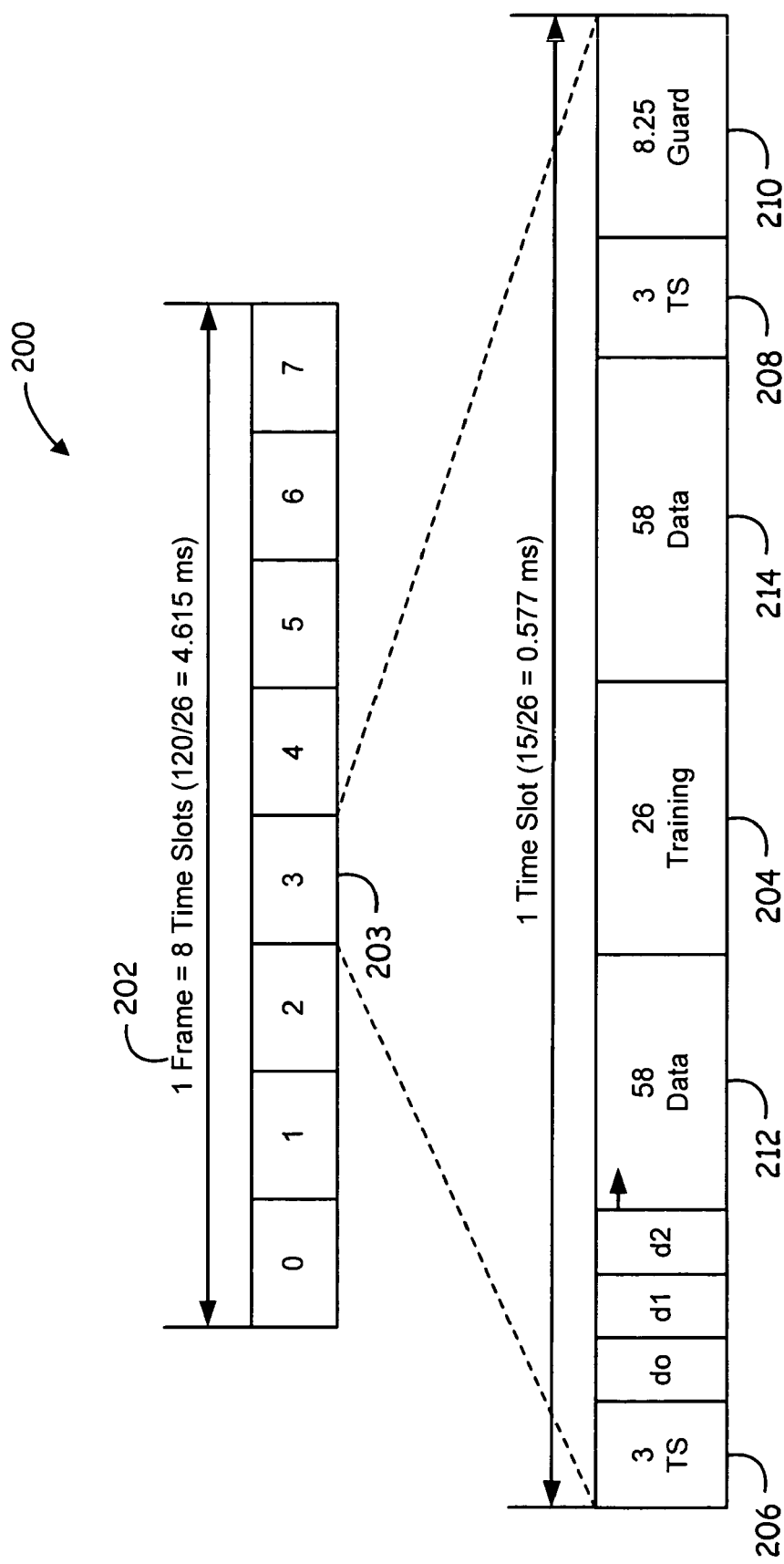
FIG. 2 is a prior art diagram of an EDGE burst structure.

Many EDGE physical layer parameters are identical (or similar) to those of GSM. The carrier spacing is 200 kHz, and GSM's TDMA frame structure is unchanged. FIG. 2 shows a representative diagram 200 of an EDGE burst structure. One frame 202 is shown to include eight time slots. Each representative time slot 203 is shown to include a training sequence 204 of 26 symbols in the middle, three tail symbols 206, 208 at either end, and 8.25 guard symbols 210 at one end. Each burst carries two sequences of 58 data symbols. The data sequences 212 and 214 are shown on either side of the training sequence 204.

Figure 3:
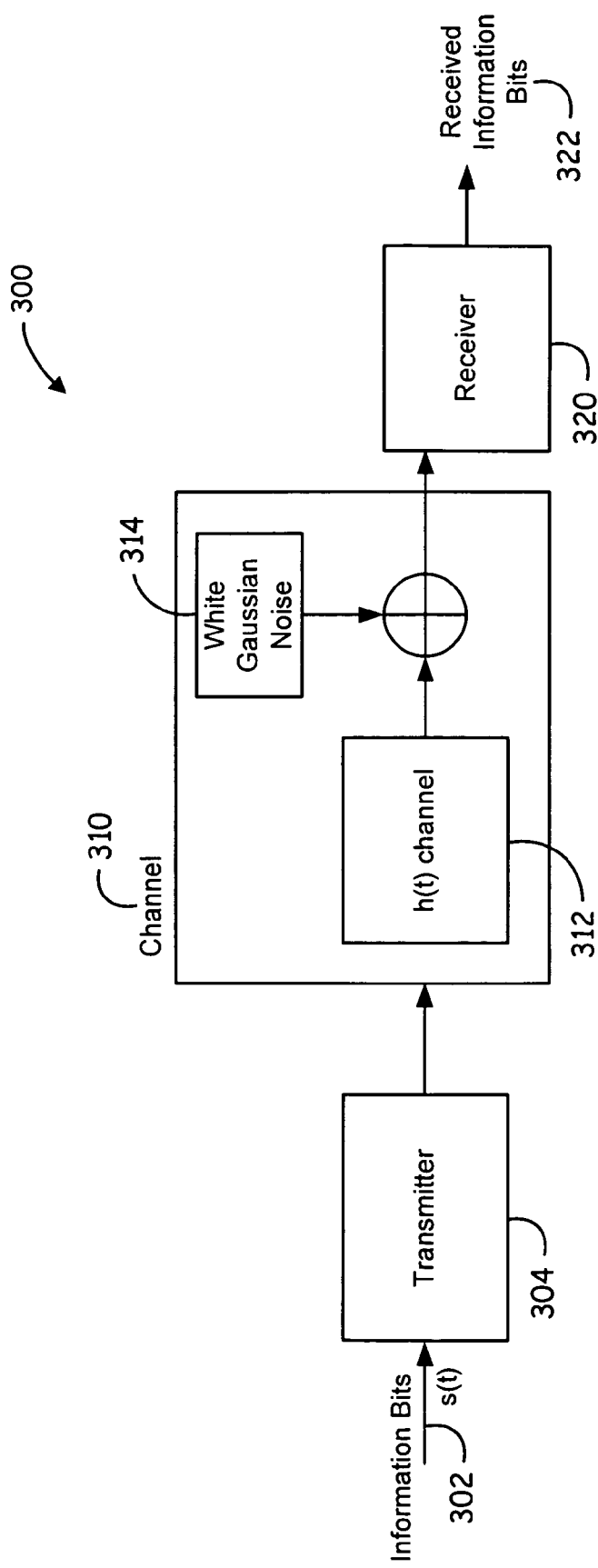
FIG. 3 is a prior art block diagram of representative transmitter, channel, and receiver.

FIG. 3 next shows a prior art block diagram 300 of a communication system that consists of a transmitter 304, a channel 310, and a receiver 320. The signal s(t) 302 represents a sequence of information that is going to be transmitted over a channel. The transmitted signal encounters a channel 310 (which includes multiplicative, dispersive component 312 and additive white Gaussian noise component 314). The receiver 320 attempts to recover the original signal s(t) as received information bits 322.

Figure 4:
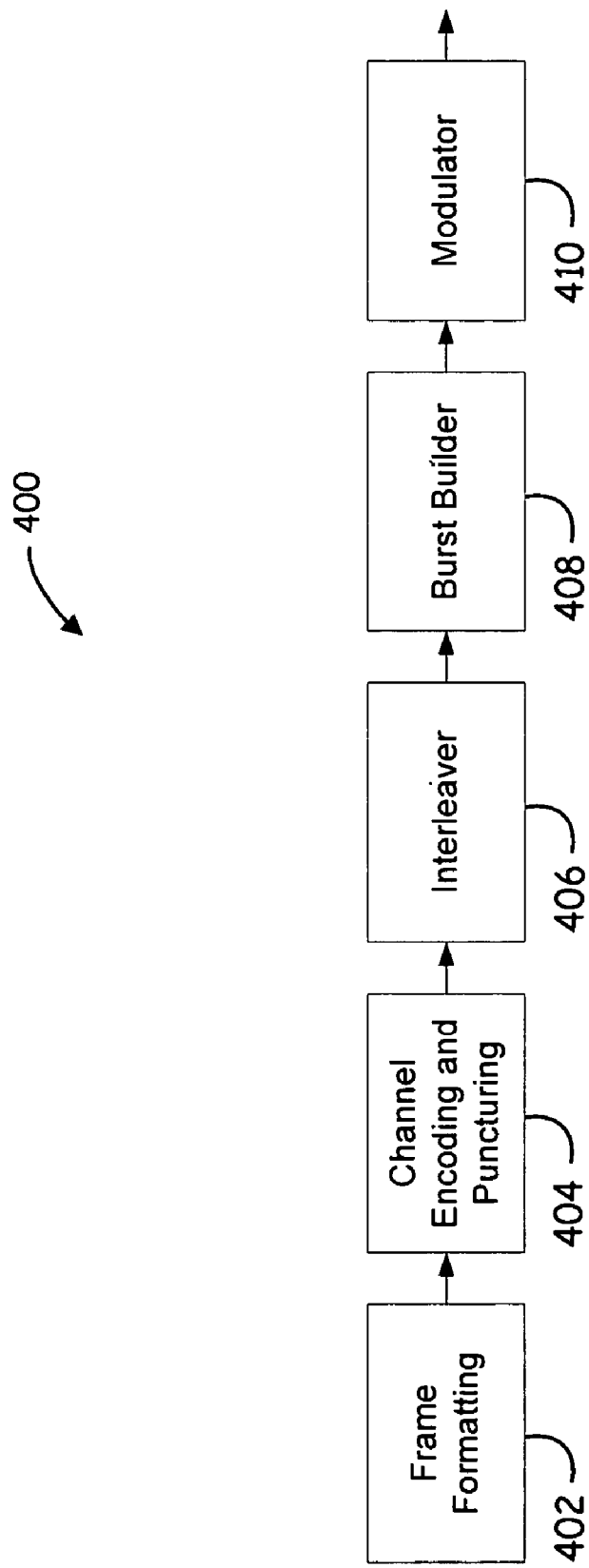
FIG. 4 is a prior art block diagram of representative transmitter elements.

A more specific block diagram of the transmitter portion 400 is shown in FIG. 4. In particular this diagram is described in terms of GSM and EDGE applications. The user data is first formatted into a frame via block 402. Thereafter the data is convolutionally encoded and punctured as shown in block 404. The signal is passed to an interleaver 406 that scrambles the coded bits and distributes them across four bursts, shown as the burst builder block 408. The GMSK or 8PSK modulator is shown receiving the subsequent signal in block 410.

Figure 5:
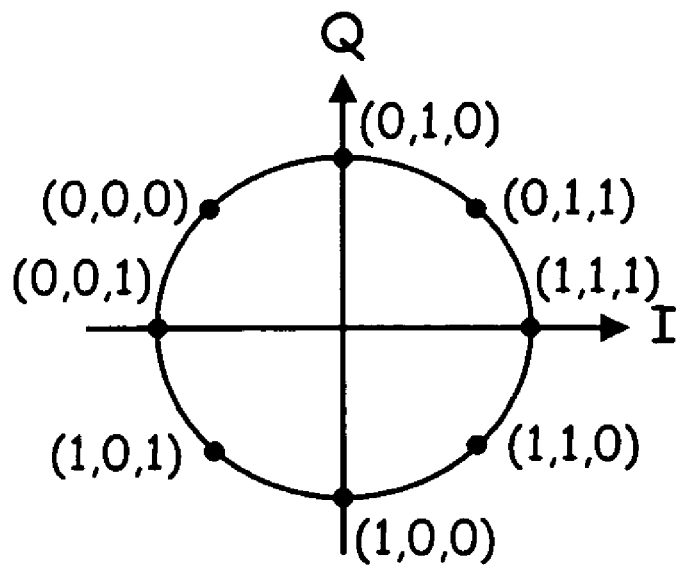
FIG. 5 is a prior art diagram of the encoding rule for an 8PSK modulator.
Figure 6:
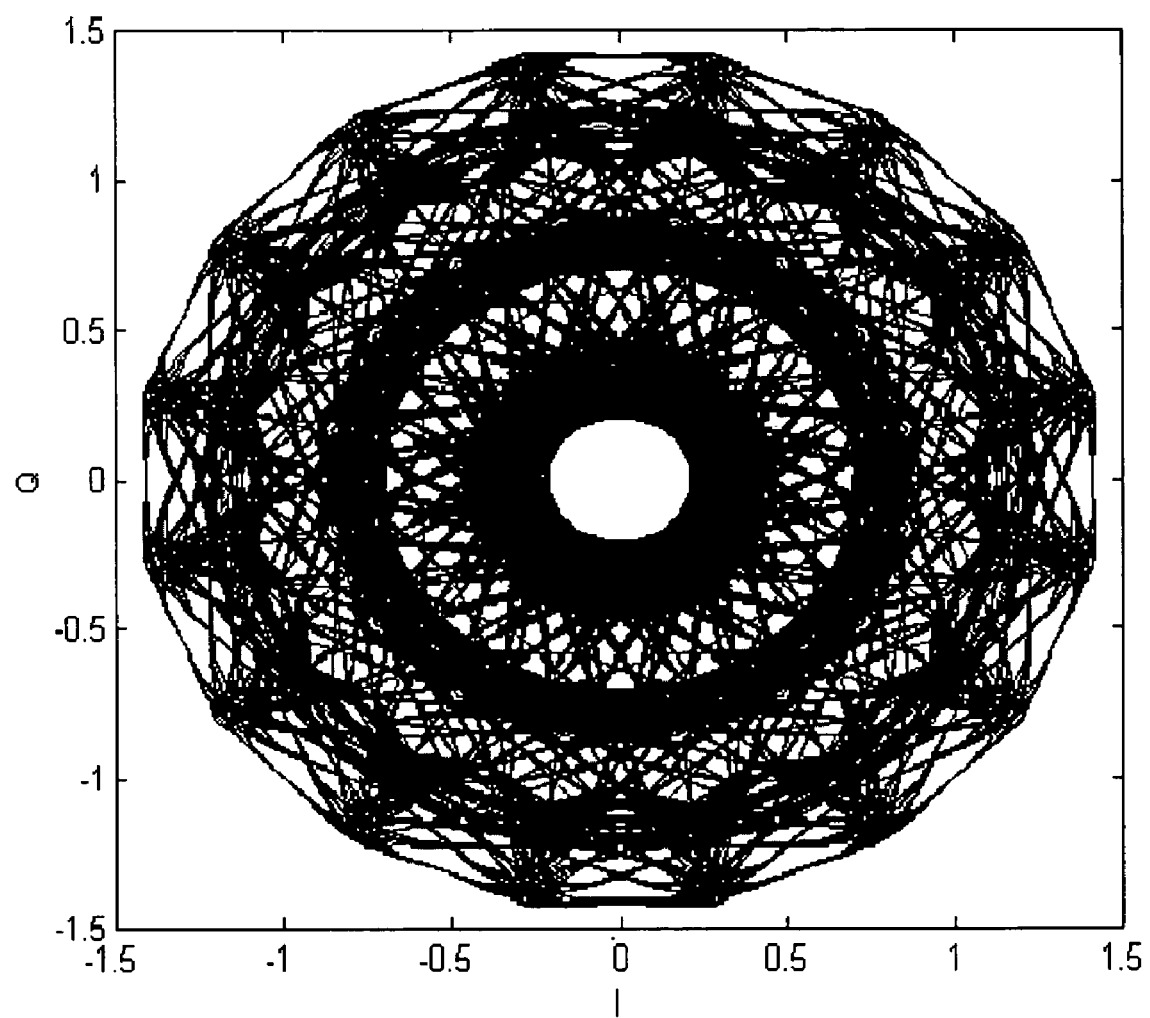
FIG. 6 is a prior art diagram of the transmitted constellation for an 8PSK signal corresponding to FIG. 5.

For 8PSK modulation, the modulating bits are mapped in groups of three to a single 8PSK symbol. The encoding rule is shown in FIG. 5, where ($d_{3i}$, $d_{3i+1}$, $d_{3i+2}$) are the output bits from the interleaver. These output symbols are then continuously rotated by a phase shift of $3/8$ radians per symbol (the symbol rate is approximately 270.833 ksps). These rotating 8PSK symbols are then pulse-shaped, using a filter with an impulse response corresponding to the main component in a Laurant decomposition of a GMSK signal. As seen in FIG. 6, this partial response signaling (caused by the pulse-shaping filter) causes the transmitted signal to have appreciable amounts of ISI.

The transmitted signal thereafter passes through a multipath fading channel h(t) and is corrupted by additive white Gaussian Noise n(t). Assuming that the span of the overall channel response is finite, the discrete-time equivalent model of the received signal can be written as $$r_n = \sum_{k=0}^{L} d_{n-k} h_k + \eta_\eta, \quad (1)$$

where L is the span of the composite channel response (consisting of the cascade pulse-shaping filter, propagation channel and the receiver front-end filter), dn is the nth transmitted data symbol, $\{h_0, h_1, \ldots, h_L\}$ are the complex coefficients of the channel response, and $\eta_n$ is the complex, zero-mean, white Gaussian random variable.

Figure 7:
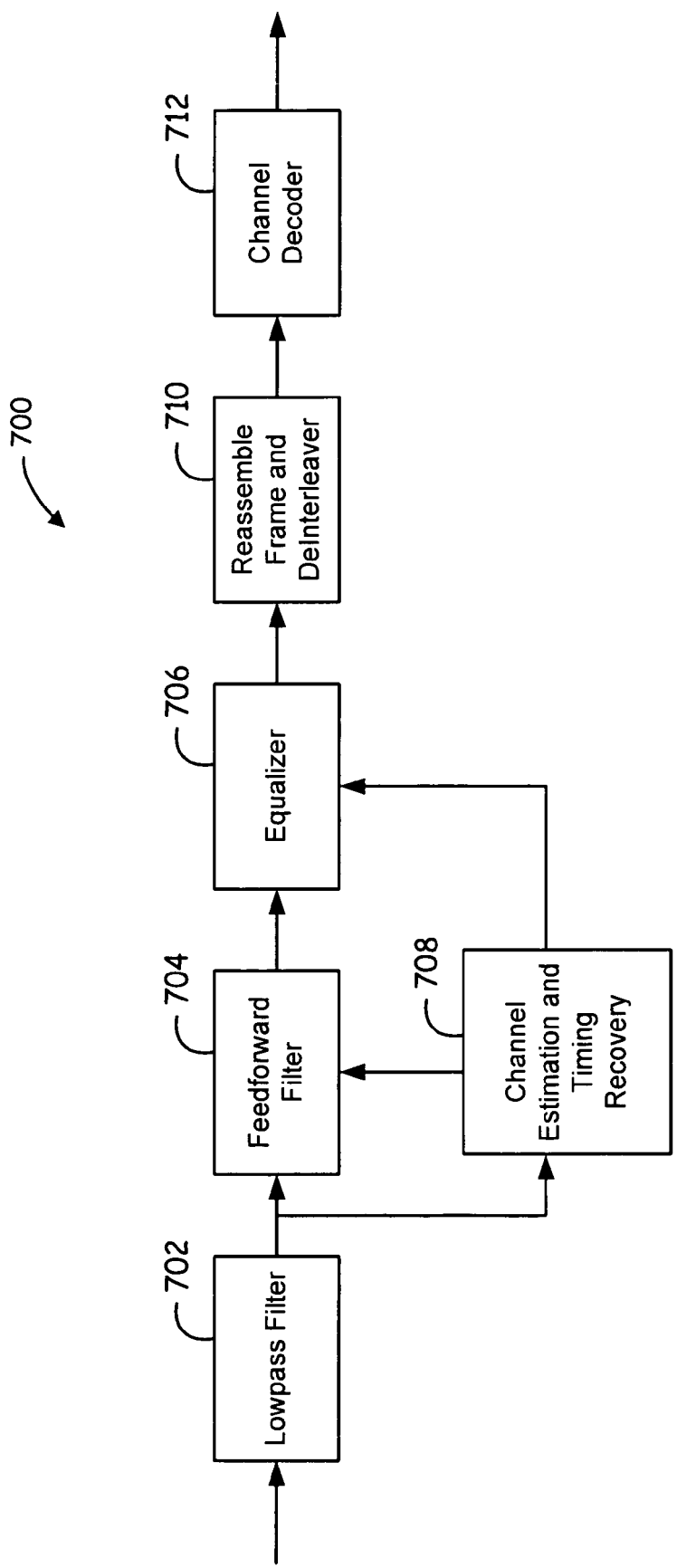
FIG. 7 is a block diagram of representative EDGE receiver elements, wherein the channel estimation might incorporate certain aspects of the present invention.

A block diagram of a typical EDGE receiver 700 is shown in FIG. 7. The received signal, after analog-to-digital conversion, is passed through a digital low-pass filter 702 (or matched filter) to enhance the signal-to-noise ratio within the signal bandwidth of interest. A feed-forward filter (FFF) 704 is used to try to convert the channel to a minimum-phase channel. The FFF coefficients are computed in block 708 based on the channel estimates, which along with the sample timing are derived from the correlation of the received signal with a known training sequence. The output from the FFF is passed to an equalizer 706, which attempts to eliminate the ISI having the composite response given by the transmitter pulse, the channel impulse response, and the receiver filter. The equalizer might be a DFE, MLSE, or MAP. In block 710, the output from the equalizer is then reassembled into a frame, and a deinterleaver is applied (if needed). This signal is then passed to the channel decoder 712, if channel coding was applied at the transmitter.

Figure 8:
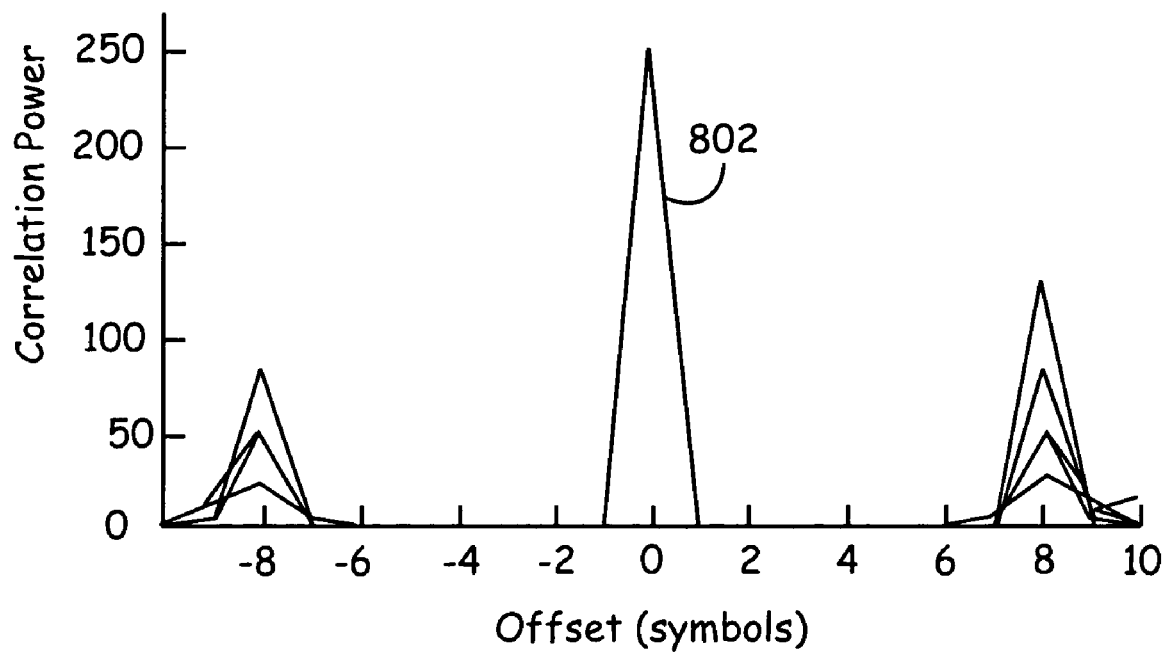
FIG. 8 is a prior art diagram of the auto-correlation of Training Sequences.

Timing recovery and channel estimation—the timing recovery and channel estimation are performed with the aid of the training sequence 204 (in FIG. 2). The training sequence has the property that the result of correlating the middle 16 symbols with the entire training sequence yields a correlation function with identically zero values for +/−5 symbols around the peak 802, as shown in FIG. 8.

For timing recovery, the oversampled received signal is correlated with the stored training sequence. The optimal symbol timing is given by the index of the subsample with the largest correlation value. Once the optimal symbol timing is determined, the estimates of the channel response, i.e., $\{h_0, h_1, \ldots h_L\}$ are given by a window of L+1 symbol-spaced correlation values with the largest sum of energy. Since the auto-correlation values given by the training sequence are approximately zero for up to +/−7 symbols around the peak 802, the maximum window size L may be as large as 7. Since the duration of the burst is 0.577 ms, the channel can be assumed to be stationary during the burst for most vehicle speeds of practical interest.

Certain well-known equalization techniques are next discussed, including DFE and MLSE/MAP devices, followed by certain representative embodiments of the proposed new technique.

Figure 9:
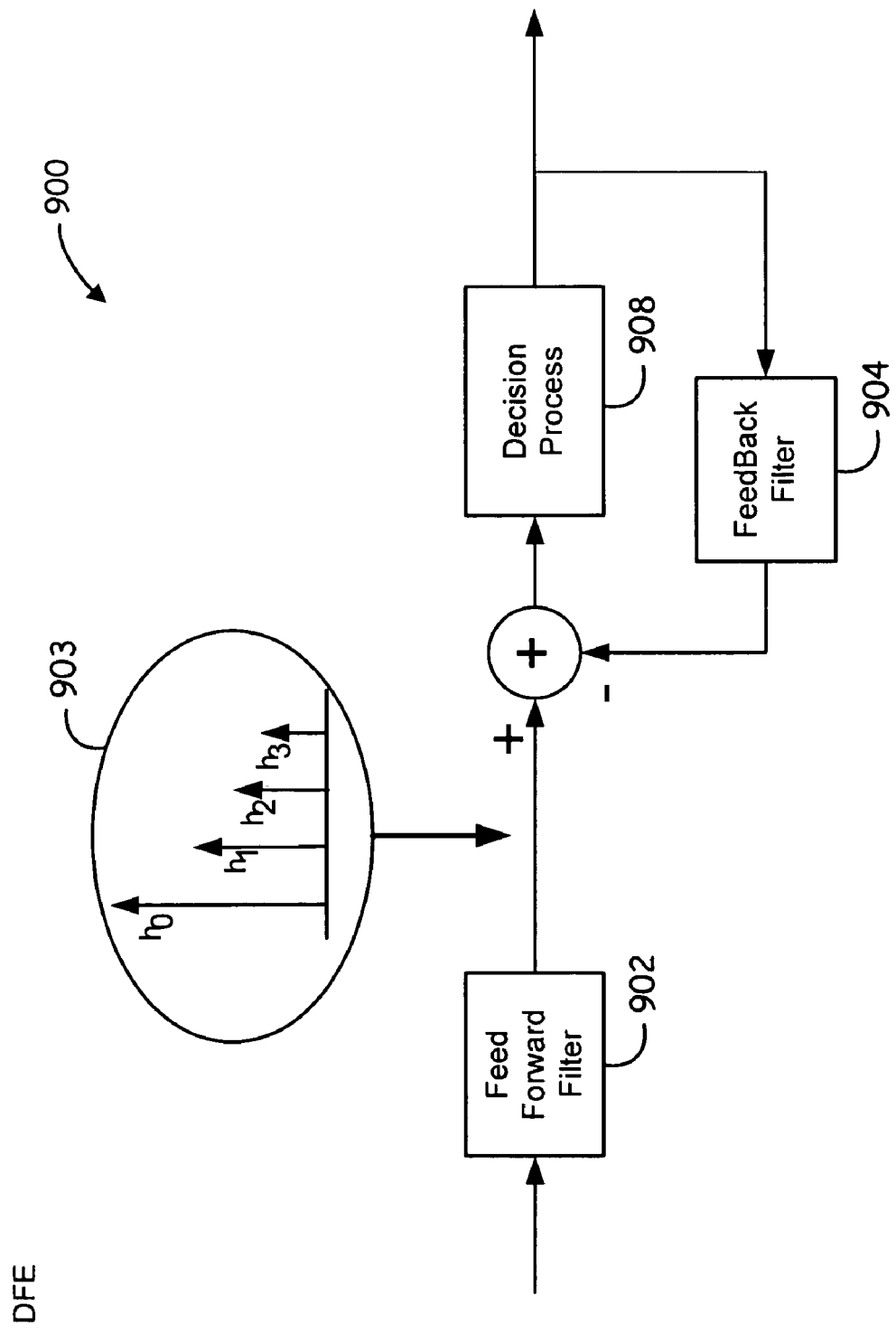
FIG. 9 is a prior art block diagram of representative DFE elements, with an associated channel response after the feed-forward filter.

Decision Feedback Equalizer—FIG. 9 shows a representative prior art block diagram 900 of a DFE device, which might be used as the equalizer device above. A standard DFE consists of two filters, a feed-forward filter (FFF) 902 and a feedback filter (FBF) 904. The FFF is generally designed to act as a whitened matched filter to the received incoming signal, thus maximizing the signal to noise ratio, while keeping the statistical properties of the noise Gaussian with zero mean. A representative signal (with interference) which might exist after the FFF is shown as 903, with signal rays $h_0$, $h_1$, $h_2$, and $h_3$. The FBF 904 is used to reconstruct post-cursor interference using decisions made on previously detected symbols. After filtering 904, the post-cursor interference is subtracted from the output of FFF 902, and a symbol decision 908 is made on this output.

Accordingly, the input to the decision device, in discrete form, is as follows:

$$z_n = \sum_{k=-N_f}^{0} f_k r_{n-k} - \sum_{k=1}^{N_b} \hat{d}_{n-k} b_k, \quad (2)$$

where $f_k$, k=-$N_f$, ..., 0 are the coefficients of the feed-forward filter, $b_k$, k=1, ..., $N_b$ are the coefficients of the feedback filter, and $\hat{d}_n$ denotes the decision made on the symbol $d_n$. The number of the feedback coefficients $N_b$ may be different from the memory of the overall channel response L. Hereafter, we will assume $N_b$=L. The coefficients of the FFF and the FBF for the DFE can be computed using a variety of computationally efficient methods. One such method entitled "Fast Computation of Channel-Estimate Based Equalizers in Packet Data Transmission" has already been incorporated by reference above.

Soft-decision decoding might also be applied to the outputs of the DFE. As shown in FIG. 7, the symbol decisions from the equalizer are de-interleaved and passed to the channel decoder. Since soft-decision decoding improves the performance, the hard symbol decisions output from the DFE are weighted with the appropriate channel gain before they are passed to the decoder. Typically a hard-decision is made on the symbol $d_n$ which is then weighted by a soft-value $s_o$, as given by the following equation, to produce an appropriate weighting for soft-decision decoding.

$$s_o = \sum_{k=0}^{L} h_k h_k^* \quad (3)$$

Hence, the soft value is a function of the channel coefficients. Other examples include making the soft value proportional to the energy gain of the channel.

MLSE/MAP. An MLSE is the optimum equalizer in the presence of finite ISI and white Gaussian noise. The equalizer consists of a matched filter followed by a Viterbi algorithm. The complexity of the equalizer is determined by the number of states of the Viterbi algorithm, $M^L$, where M is the symbol alphabet size and L is the memory of the channel. For high order modulations, such as 8PSK and 16QAM, the complexity of the equalizer is very large, even for moderate values of L.

Similar to the MLSE, the MAP criterion may be applied, resulting in an equalizer that has the same order of the complexity as the MLSE, but is able to produce soft symbol outputs. The soft symbol values improve the performance of the subsequent channel decoder for a coded system.

For the MLSE or the MAP equalizer, the feed-forward filter can be implemented as a matched filter with coefficients $f_{-k}=h_K^*$, k=0, ..., L. Athough the noise samples after the matched filter are non-white, the optimal path metric can be computed using the method described by Ungerboeck (see Gottfried Ungerboeck, "Adaptive maximum-likelihood receiver for carrier-modulated data-transmission system," IEEE Transactions on Communications, vol. COM-22, No. 5, pp. 624-636, May 1974). The path metric in the nth interval is given by:

$$\text{Re}\left[\alpha_n^*\left(y_n - \sum_{i=1}^{L} s_i \alpha_{n-i}\right)\right], \quad (4)$$

where $y_n$ is the output of the matched filter, $\alpha_n$ is the hypothetical input symbol and $\alpha_{n-i}$, i=1, ..., L is given by the state of the trellis, and $s_i$ is given by the following convolution:

$$s_i = \sum_{k=0}^{L-i} h_k^* h_{k+i} \quad (5)$$

For the MLSE, the hard symbol decisions output from the equalizer are weighed according to Equation (3) prior to being passed to the channel decoder. The MLSE/MAP equalizers typically achieve better performance over a DFE. Nevertheless, they are significantly more complex to implement than the DFE for the same channel memory.

Figure 10:
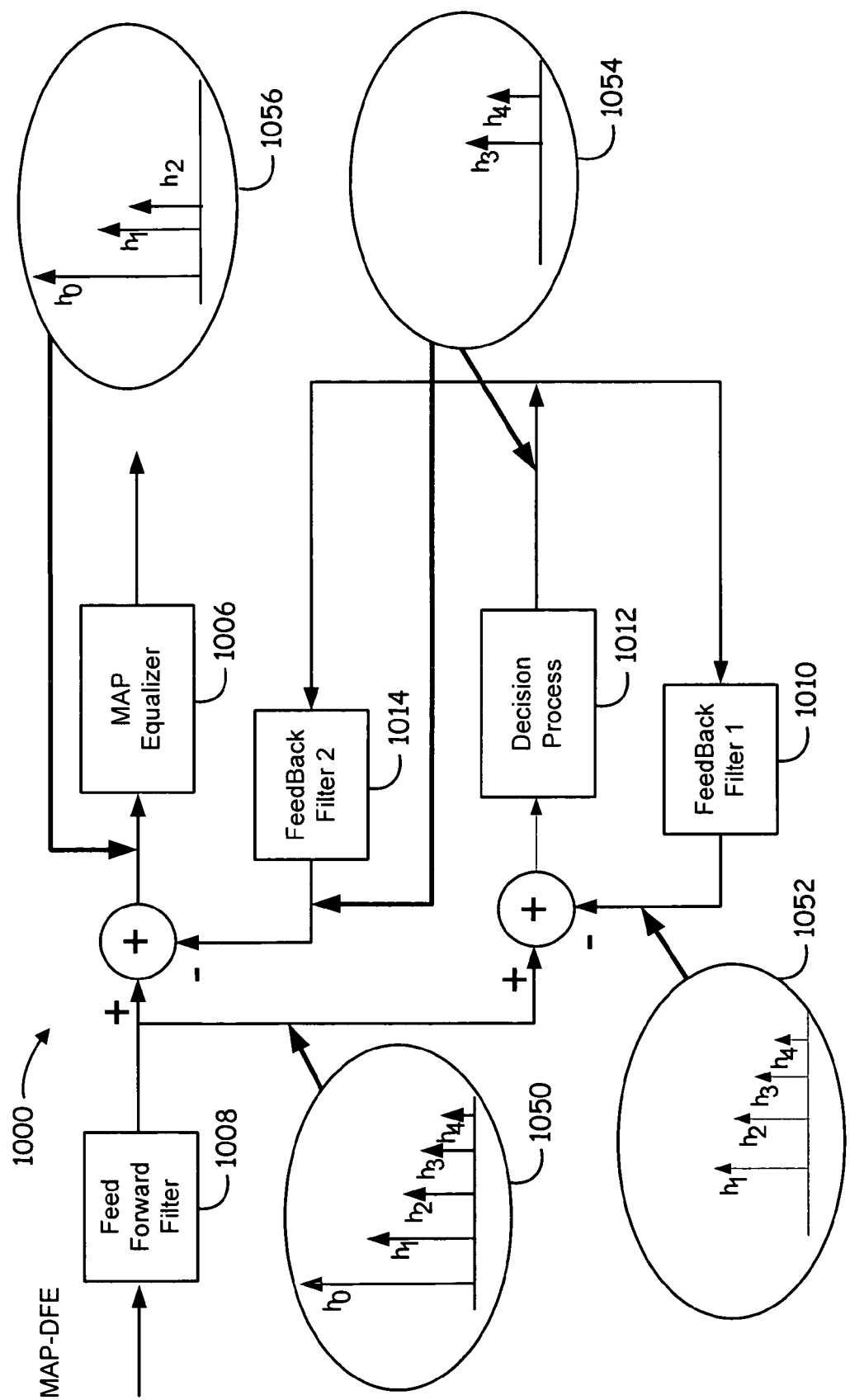
FIG. 10 is a block diagram, according to one aspect of the present invention, of certain representative elements of an equalizer which combines a DFE with a MAP equalizer.

The proposed approach for equalizing 8PSK (or other such high-order) modulation signals consists of a combination of a DFE with a MAP equalizer (DFE-MAP). A block diagram of an embodiment of the present invention 1000 is shown in FIG. 10. The equalizer architecture consists of two DFE-like structures 1002 and 1004, followed by a MAP equalizer 1006. A feed-forward filter is shown as 1008. The first DFE 1002 acts like a conventional DFE and forms tentative symbol decisions. The coefficients of the feed-forward filter 1008 and the first feedback filter 1010 are derived from the channel estimates, as in the conventional DFE case. The coefficients of the second feedback filter 1014 are a subset of the coefficients of the first feedback filter 1010. The input to the decision process 1012 is thus given by the prior Equation (2).

Accordingly, a sample channel response 1050 is shown after the feed-forward filter 1008, containing signal rays $h_0$ through $h_4$. The first DFE structure 1002 serves to first provide feedback signals through the first feedback filter 1010 as shown by the signal rays $h_1$ through $h_4$ in 1052.

The purpose of the second feedback filter 1014 is to eliminate the impact of post-cursors (e.g., $h_3$ and $h_4$, shown by 1054) beyond $L_1$ symbols (e.g., set at $h_2$), and thereby truncating the channel response to a desired memory of $L_1$ symbols. The filter does this by canceling these post-cursors using the tentative decisions $\hat{d}_k$ formed by the first DFE.

This is achieved by breaking the received signal after the feed-forward filter 1008 into two parts, as shown by Equation (4), and thereafter constraining the maximum number of states in the MAP equalizer to be $M_{L_1}$ states out of a maximum possible of $M^L$ for the full state space.

$$\sum_{k=0}^{L_1} d_{n-k} b_k + \sum_{k=L_1+1}^{L} d_{n-k} b_k + \varphi_n \quad (4)$$

where $\phi$ is the noise sample at the symbol rate after passage through the whitened-matched filter.

A tentative estimate of the data sequence, $\{\hat{d}_n\}$ is produced by the first DFE structure 1002 (using hard symbols decisions of the $z_n$ output of Equation (2)), and together with the feedback coefficients, $\{b_k\}$, is used to limit the duration of the intersymbol interference to $L_1$ symbols.

Thus the input to the MAP equalizer becomes:

$$\sum_{k=-N_f}^{0} f_k r_{n-k} - \sum_{k=L_1+1}^{L} \hat{d}_{n-k} b_k, \quad (5)$$

where $L_1 \leq L$. Since the MAP equalizer now operates only on $M^{L_1}$ states, the overall complexity of the equalizer is significantly reduced.

For instance, with a channel memory of L=5, and a modulation order of 8 (as used by 8PSK), a conventional MAP equalizer would require $8^{(5-1)}$ states, or 4096 states. By using the present system, the effective channel memory seen by the MAP would be reduced to 3 (see signal 1356) and the equalizer would only require $8^{(3-1)}$ states, or 64 states. With substantially fewer states, the proposed equalizer configuration would be much more manageable and less complex to implement.

Figure 11:
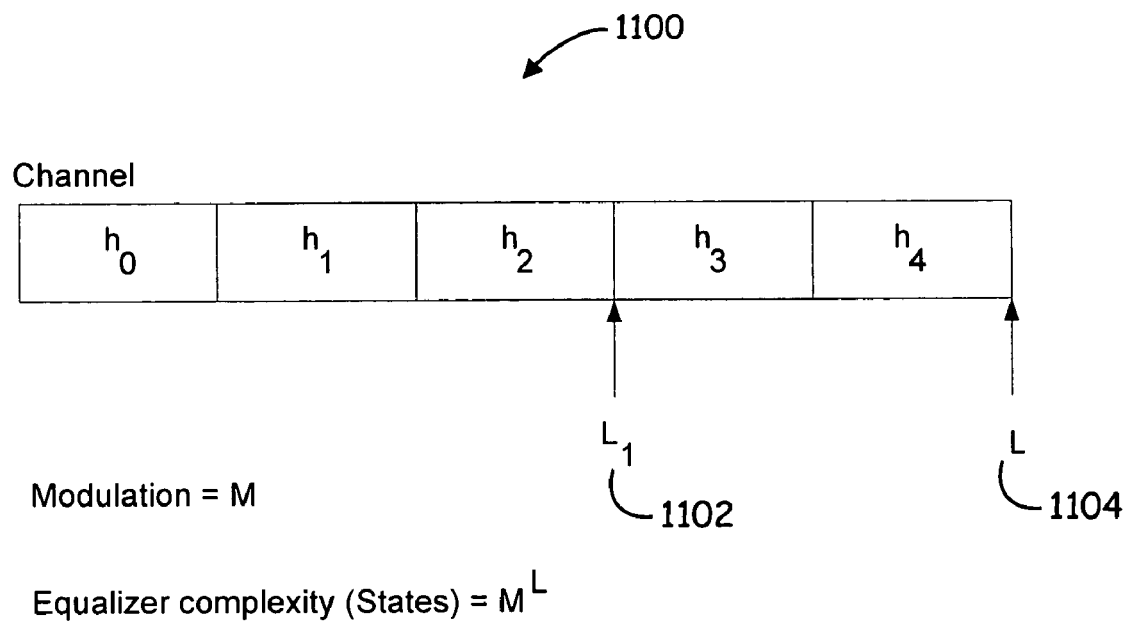
FIG. 11 is a block diagram, according to one aspect of the present invention, of a representative channel response showing the resulting elements of the truncated channel.

FIG. 11 next shows a graphical representation 1100 of this representative channel response having elements $h_0$ through $h_4$. When the value of $L_1$ (1102) is zero, the proposed equalizer degenerates to a conventional DFE, and when the value of the $L_1$=L (1104), the proposed equalizer is a full-state MAP equalizer. By choosing the appropriate value of $L_1$, certain performance and complexity trade-offs between a DFE and a full-state MAP equalizer can be made.

Figure 12:
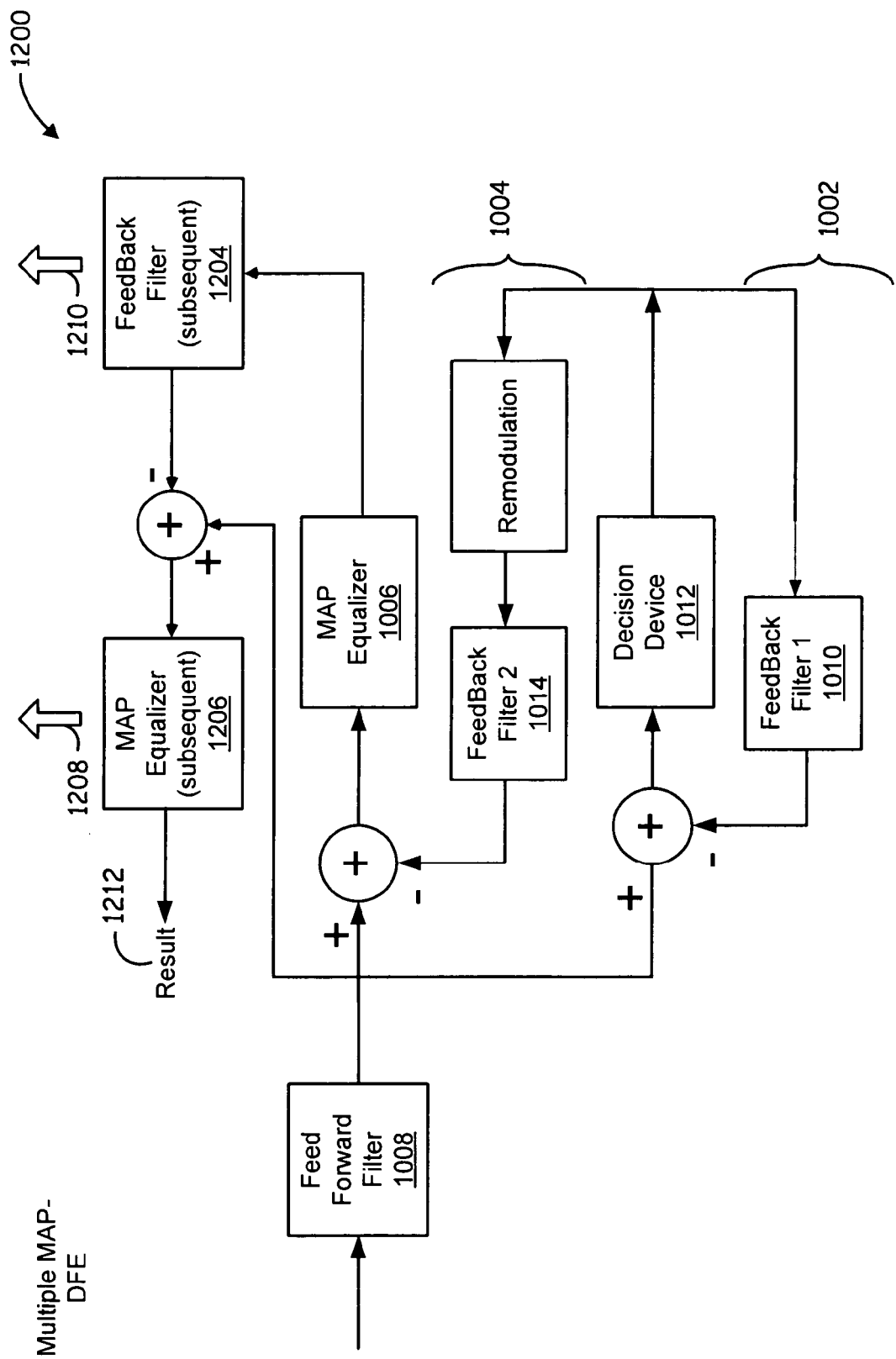
FIG. 12 is a block diagram, according to one aspect of the present invention, of certain representative elements of the present equalizer which combines a DFE with a MAP equalizer, and then also employs subsequent DFE/MAP equalizers, as needed.

While not expressly shown, it should also be noted that an MLSE equalizer can be used instead of the MAP equalizer in the present invention. The MLSE device will further reduce the complexity of the implementation but at the expense of receiver sensitivity. The present invention is not intended to be limited to the specific embodiments shown above. FIG. 12 shows a block diagram having substantially the same components (similarly numbered) as FIG. 10. After the MAP equalizer 1006, however, a subsequent feedback filter 1204 is shown. The results of this subsequent feedback filter 1204 are then subtracted from the output of the feed-forward filter 1008. This signal is then fed into a subsequent MAP equalizer 1208 to provide a result 1212 which provides even better performance characteristics. Note that the arrows 1208 and 1210 are meant to indicate that even more feedback filters and MAP equalizers might be added, if further processing is needed. Note that the addition of such subsequent filters will increase the complexity of implementation, but (again) may provide for increased performance up to certain limits, wherein additional filters will not be worth their implementation cost.

Figure 13:
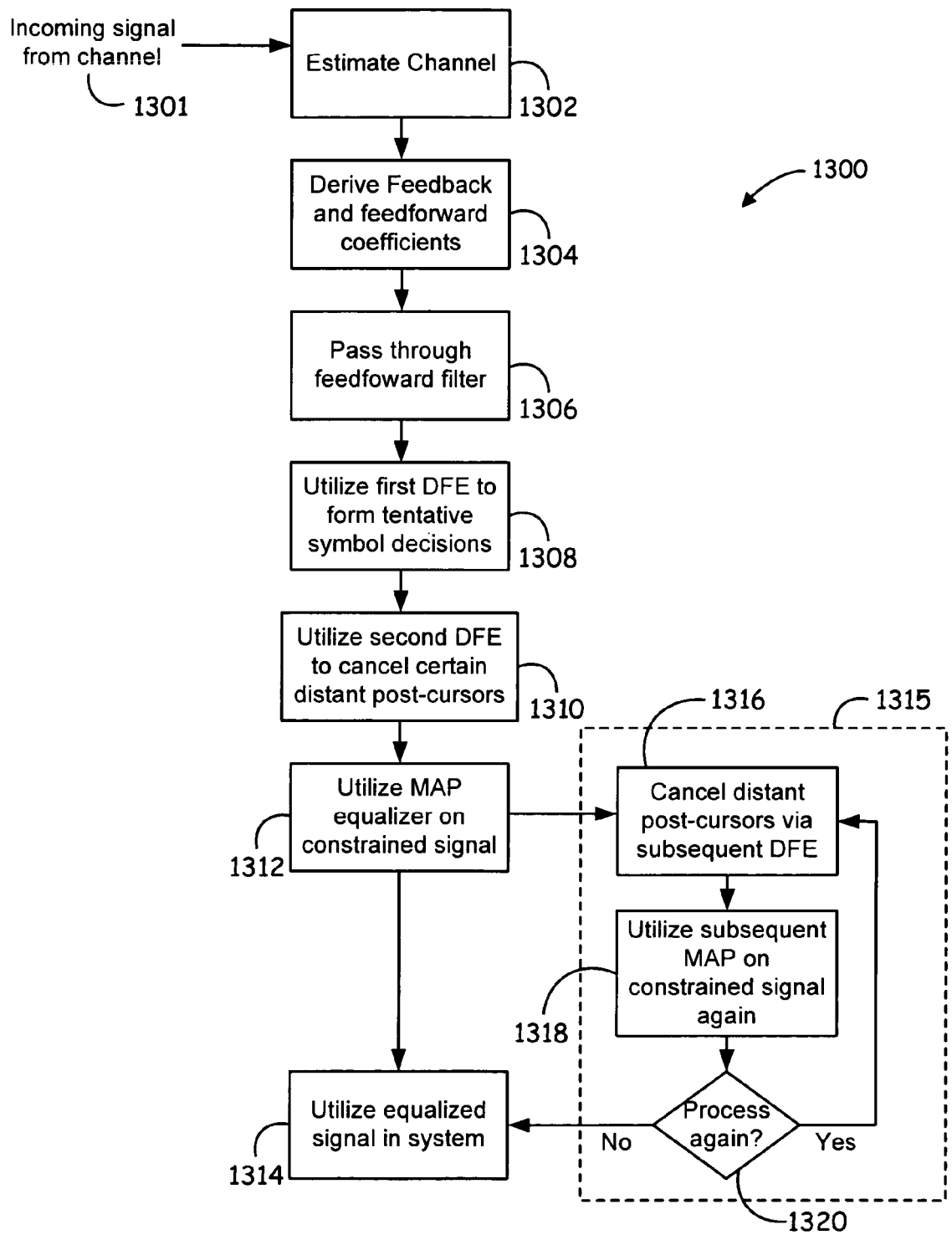
FIG. 13 is a flowchart, according to one aspect of the present invention, of certain representative steps that can be used to implement the present method of equalization.

FIG. 13 next shows a representative flowchart of certain steps 1300 that might be used to implement the present invention. In step 1302, an estimate is taken of the channel, which is shown receiving an incoming signal 1301, as per the general approaches described above. In step 1304, the feedback and feed-forward coefficients are derived for the associated filters of the DFEs, based upon the estimate of the channel response. In step 1306, the signal passes through a feed-forward filter whose coefficients have been determined above. In step 1308, a first DFE (including at least a feedback filter and decision process) is utilized to form tentative symbol decisions. Step 1310 shows the second DFE being used to cancel (or subtract) certain distant post-cursors. The number of post-cursors to be cancelled depends upon the memory of the channel response and the overall complexity desired (or a desired memory of the channel) in the final implementation. The cancellation of such post-cursors serves to truncate the memory of the channel, whereby the overall complexity of the equalizer is reduced by reducing the effective delay spread of the channel. Step 1312 next runs a MAP equalizer on this truncated channel. Thereafter the resulting signal might be utilized (1314) as an equalized signal in any system that might require such an equalized signal.

Certain optional steps for implementation are shown in block 1315. Step 1316 is shown canceling certain distant post-cursors (again, like 1310). This would be achieved by subsequent implementations of DFE components (i.e., feedback filters in association with feed-forward filters, and linear equalizers) as implied by the arrows 1208 and 1210 in FIG. 12. Block 1318 next shows the step of utilizing a subsequent MAP equalizer on the constrained signal. Decision block 1320 inquires whether further processing is needed (or desired). If yes, then steps 1316 and 1318 can be repeated as many times as might be needed with subsequent equalizer implementations (again referring to elements 1208, 1210 in FIG. 12). If no further processing is needed, then the flow proceeds to step 1314 where the resulting equalized signal is utilized.

Although the present invention has been particularly shown and described above with reference to specific embodiment(s), it is anticipated that alterations and modifications thereof will no doubt become apparent to those skilled in the art. It is therefore intended that the following claims be interpreted as covering all such alterations and modifications as fall within the true spirit and scope of the invention.

The invention claimed is:

1. An equalizer comprising:
a decision feedback equalizer operable to receive an input signal, the decision feedback equalizer comprising a decision device and a first feedback filter coupled to the decision device in feedback fashion;
a second feedback filter, separate from the first feedback filter, operable to receive a decision from the decision device and to use the decision to reduce the energy of post-cursor signal elements in the input signal and thereby produce an intermediate signal; and
a non-liner equalizer operable to receive the intermediate signal and produce an output signal based on the intermediate signal.

2. The equalizer of claim 1 wherein the second feedback filter is operable to reduce the energy of post-cursor signal elements in the input signal that exist beyond a predetermined channel memory.

3. The equalizer of claim 1 wherein the non-linear equalizer is operable to utilize the multipath energy of the intermediate signal and to make a determination as to the most-likely transmitted symbols based thereon.

4. The equalizer of claim 1 wherein the non-linear equalizer comprises a maximum likelihood sequence estimation (MLSE) equalizer.

5. The equalizer of claim 1 wherein the non-liner equalizer comprises a maximum a posteriori (MAP) equalizer.

6. The equalizer of claim 1 wherein the second feedback filter is operable to cancel post-cursor signal elements in tile input signal that exist beyond a predetermined channel memory.

7. The equalizer of claim 1 further comprising a feedforward filter operable to receive an incoming signal, increase the signal-to-noise ratio of the incoming signal, and provide the resulting signal as the input to the decision feedback filter.

* * * * *

UNITED STATES PATENT AND TRADEMARK OFFICE
CERTIFICATE OF CORRECTION

PATENT NO.       : 7,656,943 B2                                                     Page 1 of 1
APPLICATION NO.  : 11/376002
DATED            : February 2, 2010
INVENTOR(S)      : Allpress et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this

Thirtieth Day of November, 2010

David J. Kappos
*Director of the United States Patent and Trademark Office*